United States Patent
Ho et al.

(10) Patent No.: US 9,766,332 B2
(45) Date of Patent: Sep. 19, 2017

(54) NON-CONTACT MONITORING SYSTEM AND METHOD THEREOF

(71) Applicant: HTC Corporation, Taoyuan, Taoyuan County (TW)

(72) Inventors: Chien-Ting Ho, Taoyuan (TW); Yen-Liang Kuo, Taoyuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 341 days.

(21) Appl. No.: 14/566,880

(22) Filed: Dec. 11, 2014

(65) Prior Publication Data

US 2016/0170017 A1 Jun. 16, 2016

(51) Int. Cl.
| | |
|---|---|
| *G01S 13/86* | (2006.01) |
| *G01S 13/88* | (2006.01) |
| *G01S 7/41* | (2006.01) |
| *G01S 7/00* | (2006.01) |
| *G01S 13/56* | (2006.01) |
| *G08B 13/16* | (2006.01) |

(52) U.S. Cl.
CPC ............ *G01S 13/886* (2013.01); *G01S 7/003* (2013.01); *G01S 7/415* (2013.01); *G01S 13/56* (2013.01); *G01S 13/86* (2013.01); *G08B 13/1645* (2013.01)

(58) Field of Classification Search
CPC ........ G01S 13/86; G01S 13/56; G01S 13/886; G01S 17/023; G01S 7/003; G01S 7/415
USPC ...................................... 342/114, 28, 53, 61
See application file for complete search history.

(56) References Cited

U.S. PATENT DOCUMENTS

| | | | |
|---|---|---|---|
| 9,247,215 B1* | 1/2016 | Athan | G01C 3/06 |
| 2004/0051659 A1* | 3/2004 | Garrison | G01S 13/931 |
| | | | 342/70 |
| 2013/0176192 A1* | 7/2013 | Varga | G09G 3/04 |
| | | | 345/7 |

FOREIGN PATENT DOCUMENTS

| | | |
|---|---|---|
| CN | 2700969 Y | 5/2005 |
| CN | 201444336 U | 4/2010 |
| CN | 101972102 A | 2/2011 |
| CN | 102376144 A | 3/2012 |

(Continued)

OTHER PUBLICATIONS

Decision of Rejection from the corresponding Taiwanese Application No. 103143466 mailed Dec. 13, 2016.

*Primary Examiner* — Timothy A Brainard
(74) *Attorney, Agent, or Firm* — Muncy, Geissler, Olds & Lowe, P.C.

(57) ABSTRACT

The present invention provides a non-contact monitoring system, including: a radar detection module, an infrared sensing module, a micro control unit and a communication module. The radar detection module transmits a radar detection signal via the radar antenna to an area, receives a radar reflection signal from the area, and transmits the radar reflection signal to the micro control unit. The infrared sensing module detects a heat source of an organism in the area, and transmits an infrared sensing signal to the micro control unit. The micro control unit receives and processes the radar reflection signal transmitted by the radar detection module and the infrared sensing signal transmitted by the infrared sensing module, and transmits an alarm signal to the communication module. The communication module receives the alarm signal transmitted by the micro control unit, and transmits the alarm signal to a remote monitoring end via the antenna.

18 Claims, 4 Drawing Sheets

(56) References Cited

FOREIGN PATENT DOCUMENTS

| | | |
|---|---|---|
| CN | 202632475 U | 12/2012 |
| CN | 103761833 A | 4/2014 |
| JP | 2010160606 A | 7/2010 |
| TW | M362478 | 8/2009 |
| TW | 201314631 A | 4/2013 |
| TW | 201322191 A | 6/2013 |
| TW | 201337846 A | 9/2013 |

* cited by examiner

NON-CONTACT MONITORING SYSTEM AND METHOD THEREOF

BACKGROUND OF THE INVENTION

1. Field of the Invention

The present invention relates to the field of dynamic monitoring and electric communication, and more particularly, relates to an enhanced non-contact monitoring system formed by the combination of an infrared sensing system and a radar detection system.

2. Description of Related Art

Organisms radiate heat under room temperature, and the heat radiation generated by organisms is within a detectable range of infrared sensing systems; therefore, it is possible to sense the heat radiation generated by various organisms with various types of infrared sensing system. For example, human bodies, animals, plants or even mechanical devices all radiate infrared ray of a certain wavelength. A variety of applications have been derived based on the above phenomena. In day to day life, common applications include communications, anti-theft systems, photography, and detection purposes such as detecting location of human bodies or objects.

Even though the use of an infrared system to detect the location of human body in an indoor space is well known, conventional infrared systems are usually designed to detect a single heat source only. When there are more than two heat sources present in an indoor space, conventional infrared systems are likely to make false judgments. For example, when the interior space is a bathroom, conventional infrared system not only senses the heat radiation from the human body, but also sense the heat radiation from the hot water or steam. When the infrared sensing system is used in such an environment with multiple heat sources, it is likely to make false judgments. As a result, when an accident happens to a user in the bathroom, it is possible for the infrared sensing system to confuse the heat radiation from the hot water or steam with the heat radiation from the human body, thus losing the purpose of timely detecting emergency situations.

On the other hand, a radar detection system detects movement of an object by sending a radar detection signal to an area. If the object is present in the area and is in the state of motion, the properties of the radar reflection signal reflected by the surface of the object would change accordingly, e.g. reflection time, phase and etc.; therefore, the radar detection system is able to effectively detect the movement of the object in the area without being affected by heat radiation.

Although the use of radar detection systems to detect motion changes of human bodies in an indoor space is well known, conventional radar detection systems can only determine the changes in motion with the reflection distance of the radar signal. Under such circumstances, there is a possibility that the result can be deviated by foreign objects, which will further result in erroneous alarm signal, or result in not sending out alarm signal in time, and thus resulting in failing to notify the detection of emergency situations.

Therefore, for non-contact monitoring systems, there is an urgent need to develop a system that combines the advantages of the infrared sensing system and the radar detections system. Such a combined system can detect the location of the organism and the change in motion of the organism while avoiding the disadvantages of using only the infrared sensing system or the radar detection system; in addition, the radar detection system can be used to detect the vital signs information of the organism.

SUMMARY OF THE INVENTION

Based on the above reasons, a primary objective of the present invention is to provide a non-contact monitoring system. The non-contact monitoring system includes: a radar detection module, an infrared sensing module, a micro control unit and a communication module. The radar detection module is connected to a radar antenna and the micro control unit. The radar detection module transmits a radar detection signal via the radar antenna to an area, receives a radar reflection signal from the area, and transmits the radar reflection signal to the micro control unit. The infrared sensing module is connected to the micro control unit. The infrared sensing module detects a heat source of an organism in the area, and transmits an infrared sensing signal to the micro control unit. The micro control unit is connected to the radar detection module, the infrared sensing module and a communication module. The micro control unit receives and processes the radar reflection signal transmitted by the radar detection module and the infrared sensing signal transmitted by the infrared sensing module, and transmits an alarm signal to the communication module. The communication module is connected to the micro control unit and an antenna. The communication module receives the alarm signal transmitted by the micro control unit, and transmits the alarm signal to a remote monitoring end via the antenna.

Preferably, when one of the radar detection module or the infrared sensing module detects that an emergency situation has happened to the organism, the micro control unit transmits the alarm signal to the communication module and activates the radar detection module to detect vital signs information of the organism.

Preferably, the vital signs information is wiredly or wirelessly transmitted to the remote monitoring end by the communication module.

Preferably, the vital signs information includes movement of the chest cavity of the organism when the organism is breathing, and includes a heart rhythm of the heartbeat of the organism.

Preferably, the emergency situation includes the falling of the organism and abnormal movements of the organism.

Preferably, the organism is one of the following: a human body, an animal body and other organisms that radiate heat.

Preferably, the area is one of the following: a bathroom, a restroom, a kitchen, and other areas.

Preferably, the remote monitoring end is one of the following: a smart-phone, a hospital, a care center and other facilities/devices.

According to an embodiment of the present invention, the non-contact monitoring system further includes: at least one microphone, a speaker, an audio encoder/decoder and a power module. The at least one microphone is connected to an audio encoder/decoder for receiving a first audio signal from the organism. The speaker is connected to the audio encoder/decoder for playing a second audio signal transmitted by the remote monitoring end. The audio encoder/decoder is connected to the at least one microphone, the speaker, the micro control unit and a power module. The audio encoder/decoder encodes the first audio signal and decodes the second audio signal. The power module is connected to the radar detection module, the infrared sensing module, the micro control unit, the communication module and the audio encoder/decoder. The power module provides power to the non-contact monitoring system and the audio encoder/decoder. The communication module transmits the first audio signal to the remote monitoring end via the antenna, and receives the second audio signal transmitted by the remote monitoring end via the antenna.

Preferably, the communication module wiredly or wirelessly transmits the first audio signal to the remote monitoring end.

Preferably, the communication module wiredly or wirelessly receives the second audio signal transmitted by the remote monitoring end.

Preferably, the power module comprises an AC/DC converter, which directly connects the power module to an AC power source.

Preferably, the power module is a rechargeable battery.

Furthermore, another objective of the present invention is to provide a non-contact monitoring method. The non-contact monitoring method includes the following steps: activating an infrared sensing module while turning on an infrared sensing function of a non-contact monitoring system to detect if an organism is present in an area; using the infrared sensing module to transmit an infrared sensing signal to a micro control unit of the non-contact monitoring system, and using the micro control unit to determine whether the organism is present in the area; if the micro control unit determines that the organism is not present in the area, then the previous step is returned to; if the micro control unit determines that the organism is present in the area, then proceed to the next step; activating the infrared sensing module and a radar detection module while turning on the radar detection function and the infrared sensing function of the non-contact monitoring system to monitor the movement of the organism in the area; proceeding to next step when one of the radar detection module and the infrared sensing module detects that an emergency situation has happened to the organism; transmitting an alarm signal to a remote monitoring end with the micro control unit of the non-contact monitoring system and a communication module while activating a microphone and a speaker to perform a two-way voice communication between the organism and the remote monitoring end; and finally, detecting vital signs information of the organism with the radar detection module, and transmitting the vital signs information to the remote monitoring end via the communication module.

Preferably, the vital signs information includes movement of the chest cavity of the organism when the organism is breathing, and includes a heart rhythm of the heartbeat of the organism.

Preferably, the emergency situation includes the falling of the organism and abnormal movements of the organism.

Preferably, the organism is one of the following: a human body, an animal body and other organisms that radiate heat.

Preferably, the area is one of the following: a bathroom, a restroom, a kitchen, and other areas.

Preferably, the remote monitoring end is one of the following: a smart-phone, a hospital, a care center and other facilities/devices.

Other purposes, advantages and innovative features of the present invention will be apparent to those skilled in the art by reading the detailed description in the following section, with reference to the attached drawings.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
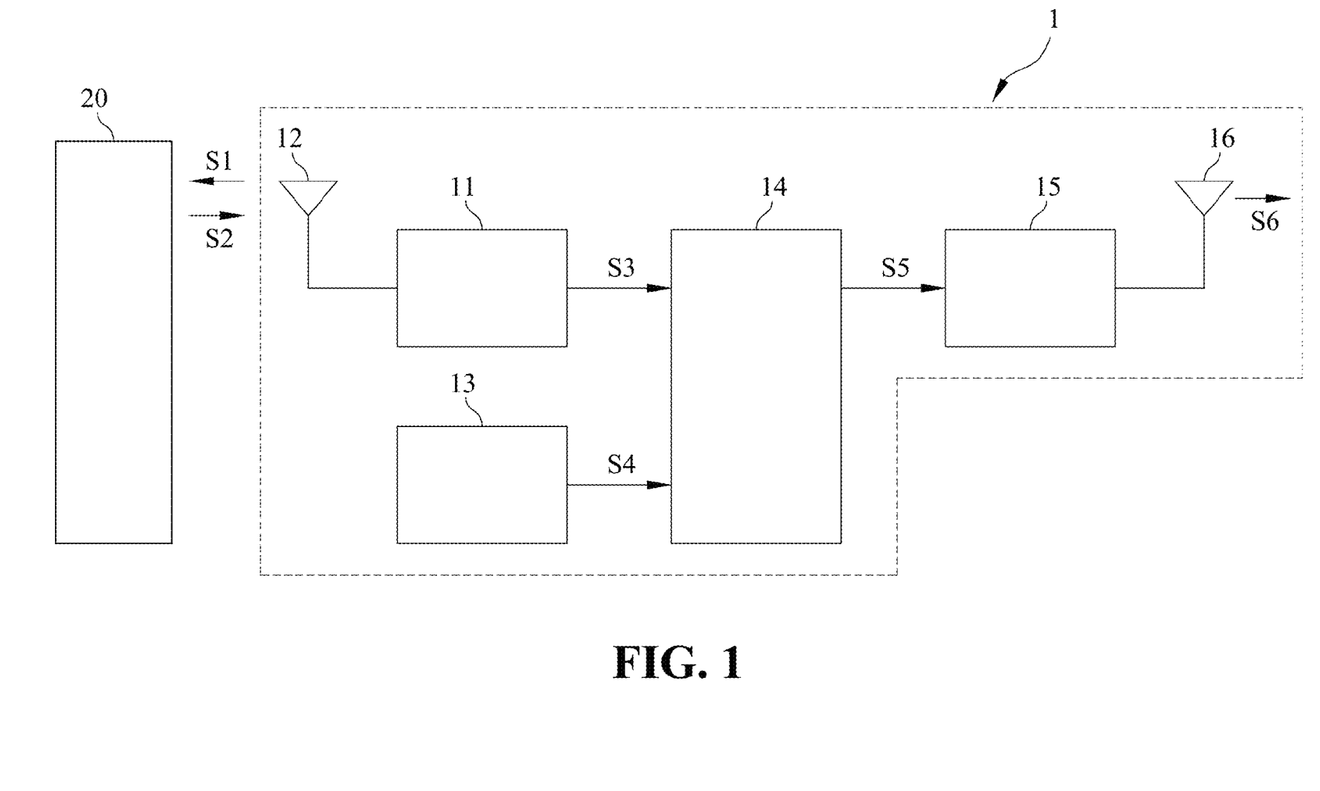
FIG. 1 is a block diagram illustrating the non-contact monitoring system of the present invention.

FIG. 1 is a block diagram illustrating the non-contact monitoring system of the present invention. As shown in FIG. 1, the non-contact monitoring system 1 of the present invention includes: a radar detection module 11, a radar antenna 12, an infrared sensing module 13, a micro control unit 14, a communication module 15 and an antenna 16. The radar detection module 11 is connected to the radar antenna 12 and the micro control unit 14. The radar detection module 11 can transmit a radar detection signal S1 to an area 20 via the radar antenna 12, and subsequently, receives a radar reflection signal S2 from the area 20. Upon receiving the radar reflection signal S2, the radar detection module 11 converts the radar reflection signal S2 and transmits a radar reflection signal S3 to the micro control unit 14. The infrared sensing module 13 is connected to the micro control unit 14, and is able to detect heat source information of an organism within the area 20. In the first embodiment of the present invention, the organism in the area 20 can be a human body; however, in other embodiments, the organism in the area 20 can also be an animal body or other organisms with heat radiation. Upon detection of the heat source of the organism, the infrared sensing module 13 transmits an infrared sensing signal S4 to the micro control unit 14. The micro control unit 14 is connected to the radar detection module 11, the infrared sensing module and the communication module 15. The micro control unit 14 is able to receive the radar reflection signal S3 transmitted by the radar detection module 11 and the infrared sensing signal S4 transmitted by the infrared sensing module 13. After receiving the signals, the micro control unit 14 then processes and analyzes the radar reflection signals S3 and the infrared sensing signal S4. If one of the radar detection module 11 and the infrared sensing module 13 detects that an emergency situation has happened to the organism, for example, when the organism has fallen down, the micro control unit 14 will transmit an alarm signal S5 to the communication module 15, which includes a transceiver and a baseband processing circuit (not shown in FIG. 1). The communication module 15 is connected to the micro control unit 14 and the antenna 16, and is able to receive the alarm signal S5 transmitted by the micro control unit 14. The communication module 15 converts the alarm signal S5 to an alarm signal S6, which is in a signal format that can be transmitted by the communication module 15. After the conversion, the communication module 15 wiredly or wirelessly transmits the alarm signal S6 to a remote monitoring end (not shown in FIG. 1), so the remote monitoring end is notified of the emergency situation that has happened to the organism in the area 20 immediately. As a result, the remote monitoring end can take corresponding measures promptly.

Figure 2:
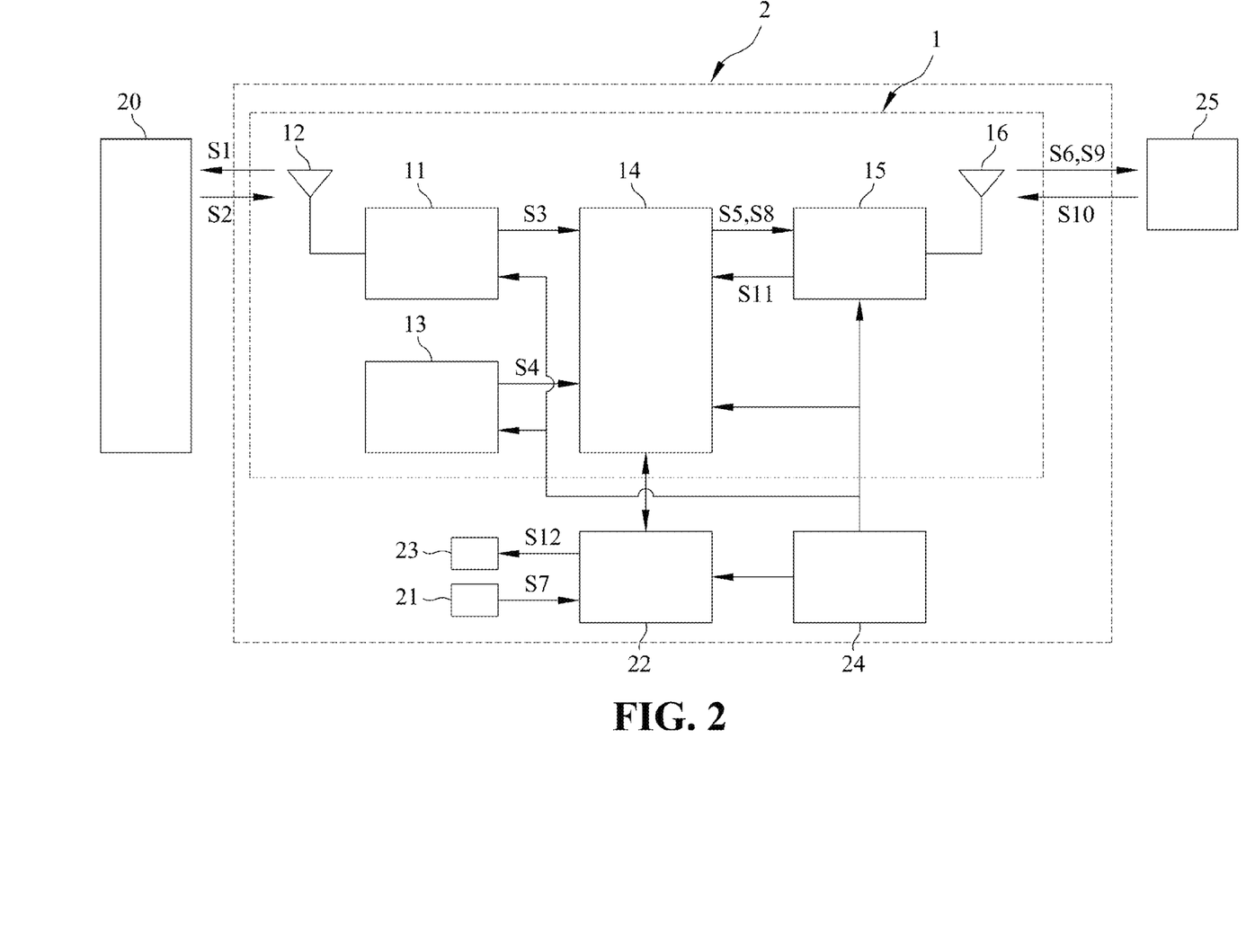
FIG. 2 is a detailed block diagram illustrating the non-contact monitoring system of the present invention.

FIG. 2 is a detailed block diagram illustrating the non-contact monitoring system of the present invention. As shown in FIG. 2, in addition to the components of the non-contact monitoring system 1 described above, the non-contact monitoring system according to the first embodiment of the present invention further includes a microphone 21, an audio encoder/decoder 22, a speaker 23 and a power module 24. The microphone 21 is connected to the audio encoder/decoder 22, and is able to receive audio signals from the organism under emergency situations. The audio encoder/decoder 22 is connected to the microphone 21, the speaker 23, the micro control unit 13 and the power module 24. The audio encoder/decoder 22 is able to encode/decode audio signals. The speaker 23 is connected to the audio encoder/decoder 22, and is able to play audio signals transmitted by the remote monitoring end 25. The power module 24 is connected to the radar detection module 11, infrared sensing module 13, micro control unit 14, communication module 15 and the audio encoder/decoder 22. The power module 24 is able to provide power to the non-contact monitoring system 1 and the audio encoder/decoder 22. In the first embodiment of the present invention, the number of microphone 21 used in the non-contact monitoring system 2 is one; however, in other embodiments of the present invention, the number of microphone 21 used can be more than one, so as to receive audio signals of a user from various locations within the area 20. In addition, in other embodiments of the present invention, the power module 24 includes an AC/DC converter (not shown in FIG. 2), which can connect the power module directly to an AC power source. In another embodiment of the present invention, the power module 24 can be a rechargeable battery.

When the non-contact monitoring system 2 according to the first embodiment of the present invention detects that an emergency has happened to the organism (e.g., when the organism has fallen down), the non-contact monitoring system 2 will activate the microphone 21 to receive an audio signal S7 from the organism in the emergency situation. Next, the audio encoder/decoder 22 encodes the audio signal S7 first before transmitting the encoded audio signal S8. Subsequently, the audio signal S8 is transmitted to the communication module 15 via the micro control unit 14 in order for it to be converted into an audio signal S9 by the communication module 15. The audio signal S9 is in a signal format that can be transmitted by the communication module 15. Lastly, the communication module 15 wiredly or wirelessly transmits the audio signal S9 to the remote monitoring end 25 via the antenna 16. When the remote monitoring end 25 receives the audio signal S9, the remote monitoring end 25 sends out an audio signal S10 as a response. The purpose of the audio signal S10 is to confirm the consciousness of the organism in the emergency situation. If the organism in the emergency situation does not respond to the audio signal S10, the remote monitoring end 25 would know that the organism is in a serious condition and needs to be taken care of immediately. The audio signal S10 transmitted by the remote monitoring end 25 is wiredly or wirelessly transmitted to the antenna 16 first, and is transmitted to the communication module 15 via the antenna 16. The communication module 15 then converts the audio signal S10 into an audio signal S11, which is in a format suitable for internal transmission within the non-contact monitoring system 2. Subsequently, the communication module 15 transmits the audio signal S11 to the audio encoder/decoder 22 via micro control unit 14 for decoding. Lastly, the decoded audio signal S12 is transmitted to the speaker 23 by the audio encoder/decoder 22, and the audio signal S12 is played by the speaker 23.

Figure 3:
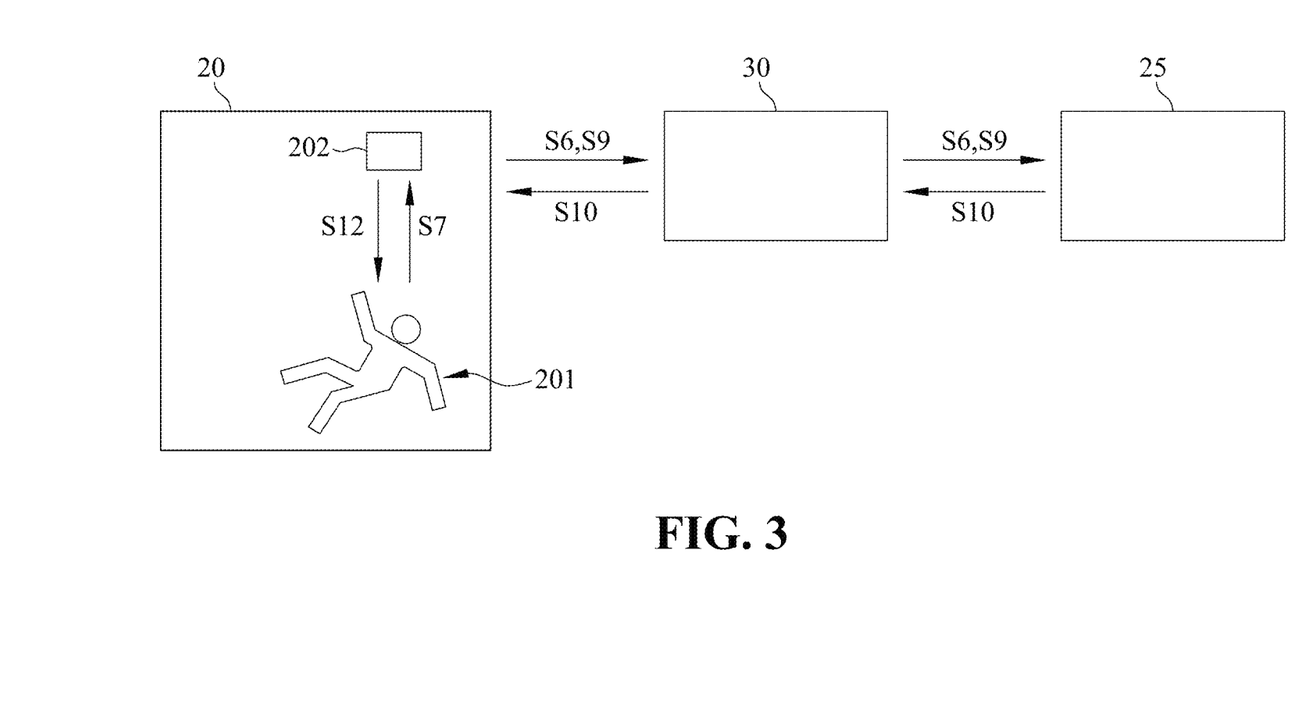
FIG. 3 is an operational block diagram illustrating the operation of the non-contact monitoring system of the present invention.

FIG. 3 is an operational block diagram illustrating the operation of the non-contact monitoring system of the present invention. As shown in FIGS. 2 and 3, a non-contact monitoring device 202 is installed in the area 20. A non-contact monitoring system 2 according to the first embodiment of the present invention is installed inside the non-contact monitoring device 202. In the first embodiment of the present invention, the area 20 is set to be a bath room; however, the area 20 can also be other areas/spaces in other embodiments, such as a kitchen, a living room, a restroom, a bed room or other areas/spaces. When an organism enters the area 20, the infrared sensing module 13 of the non-contact monitoring system 2 senses the heat radiation from the organism 201 and transmits an infrared sensing signal S4 to the micro control unit 14. Upon receiving the infrared sensing signal S4, the micro control unit 14 will activate the radar detection module 11 and the infrared sensing module 13 to monitor the movements of the organism 201. In the operation according to the first embodiment of the present invention, the organism 201 in the area 20 can be a human body; however, the organism 201 can also be an animal body or other organisms with heat radiation in other embodiments. Once the monitoring process is started, the radar reflection signal S2 received by the radar detection module 11 is converted into a radar reflection signal S3, and the radar detection module 11 transmits the radar reflection signal S3 to the micro control unit 14. Similarly, the infrared sensing module 13 transmits any detected infrared sensing signals S4 to the micro control unit 14. When one of the radar detection module 11 and the infrared sensing module 13 detects that an emergency situation has happened to the organism 201, the micro control unit 14 analyzes the emergency situation based on the radar reflection signal S3 or the infrared sensing signal S4, for example, the organism 201 fell down in the area 20. Then, the micro control unit 14 converts the alarm signal S5 into the alarm signal S6, which is in a signal format that can be transmitted by the communication module 15, so the communication module 15 can transmit the alarm signal S6 to the remote monitoring end 25 with antenna via a cloud network 30. At the same time, the micro control unit 14 will activate voice communication, so the microphone 21 can receive the audio signal S7 transmitted by the organism 201. The audio signal S7 is encoded by the audio encoder/decoder 22, and then the audio encoder/decoder 22 transmits the encoded audio signal S8 to the communication module 15 via the micro control unit. Once the communication module 15 receives the audio signal S8, the communication module 15 converts the audio signal S8 into the audio signal S9, which is in a signal format that can be transmitted by the communication module. Lastly, the audio signal S9 is transmitted to the remote monitoring end 25 with the antenna 16 via the cloud network 30. In the first embodiment of the present invention, the remote monitoring end 25 is a smart phone; however, the remote monitoring end 25 can also be other facilities/equipment such as a care center or a hospital in other embodiments. In addition, since the non-contact monitoring system 2 according to the first embodiment of the present invention combines the radar detection module 11 with the infrared sensing module 13, when the organism 201 falls down in the bathroom, the system will not be confused by the heat radiation generated by hot water or steam. Furthermore, since the non-contact monitoring system 2 monitors the location and movements of the organism 201 with the help of both radar detection module 11 and infrared sensing module 13, the disadvantages associated with only using the radar detection system can be avoided.

After the micro control unit 14 analyzes and determines the emergency situation based on the radar reflection signal S3 and the infrared sensing signal S4, the micro control unit 14 will activate the radar detection module 11 to detect vital signs information of the organism 201. The vital signs information of the organism 201 includes the detection of large movements and small movements, for example, the vital signs information includes the rise and fall of a chest cavity of the organism 201 when the organism is breathing, or movements as small as the heart rhythm of the heartbeat of the organism. The non-contact monitoring system can determine the level of harming the emergency situation based on the vital signs information of the organism; meanwhile, the vital signs information is sent to the remote monitoring end 25 by the communication module 15, so the remote monitoring end 25 is notified of the health situation of the organism 201 immediately.

In the first embodiment of the present invention, after the remote monitoring end 25 receives the alarm signal S6 or the audio signal S9 transmitted by the non-contact monitoring system 2, the remote monitoring end 25 may send out an audio signal S10 to the non-contact monitoring system 2 via the cloud network 30. The audio signal S10 is received by the antenna 16 and is transmitted to the communication module 15 by the antenna 16. The communication module 15 then converts the audio signal S10 into the audio signal S11, which is in a signal format that can be transmitted within the non-contact monitoring system 2. Subsequently, the communication module 15 transmits the audio signal S11 to the audio encoder/decoder 22 for decoding via the micro control unit 14. Then, the audio encoder/decoder 22 transmits the decoded audio signal S12 to the speaker 23. As a result, the audio signal S12 can be played by the speaker 23, thereby completing the two-way voice communication between the remote monitoring end 25 and the organism 201. In the first embodiment of the present invention, the cloud network 30 may wiredly or wirelessly transmit the alarm signal S6, the audio signal S9 and the audio signal S10.

The non-contact monitoring system 2 of the present invention not only monitors the organism 201 with both radar detection module 11 and infrared sensing module 13, but also achieves two-way voice communication between the remote monitoring end 25 and the organism with the audio signal S9 and audio signal S10. Due to the above reasons, the remote monitoring end 25 no longer needs a monitor to monitor the organism 201, and thus is able to protect the privacy of the organism 201. In other words, the non-contact monitoring system 2 is suitable for use in places in which the privacy of the organism 201 needs to be protected, such as in the bathroom or restroom. In addition, the non-contact monitoring system 2 of the present invention does not need to be worn on the organism 201, thus is convenient and comfortable to use.

Figure 4:
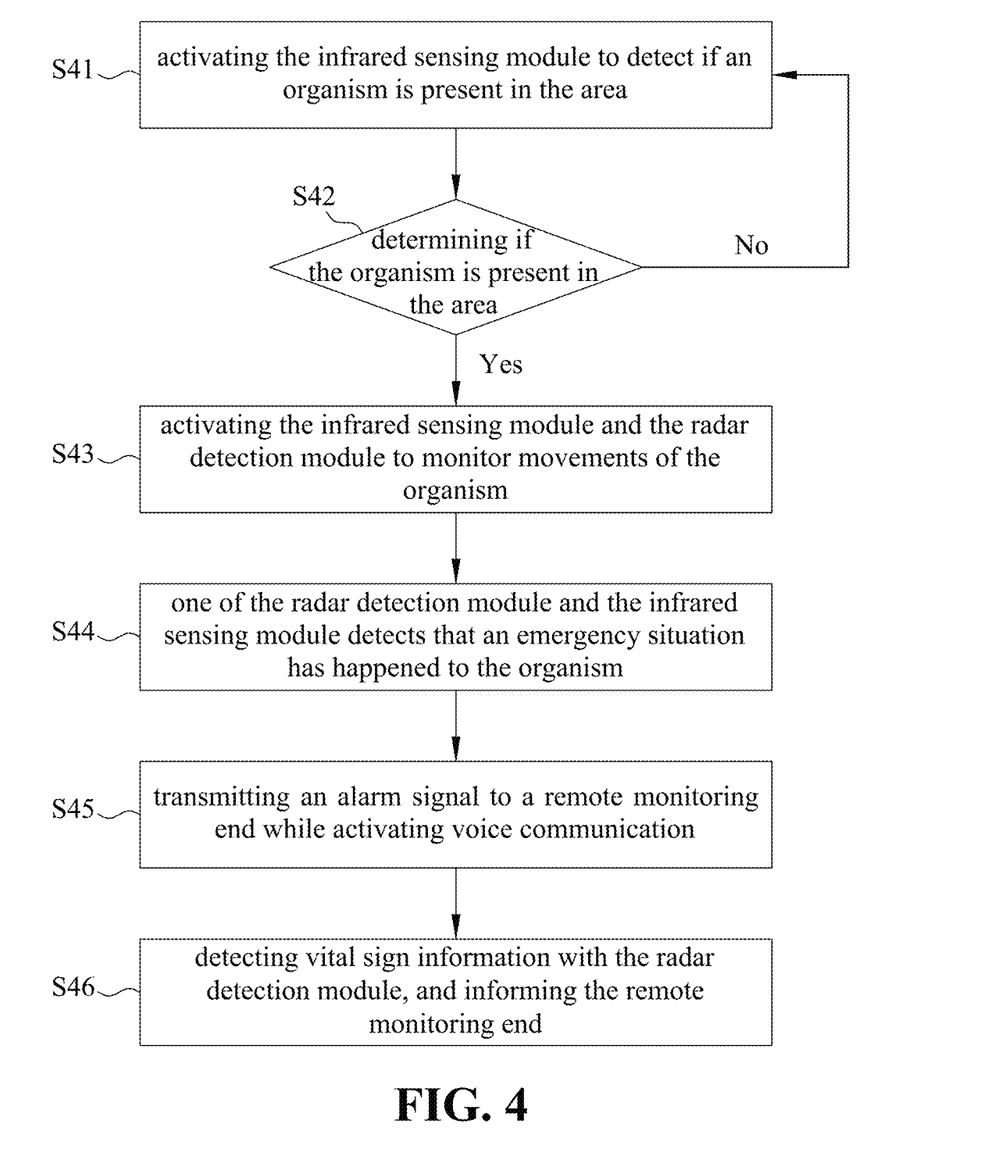
FIG. 4 is a flow diagram illustrating the operation steps of the system shown in FIG. 2.

A non-contact monitoring method is also provided in the present invention. FIG. 4 is the operational flow diagram showing the operating steps of the system shown in FIG. 2. As shown in FIGS. 2, 3 & 4, the non-contact monitoring method of the present invention includes steps S41~S46. In step S41, the non-contact monitoring system 2 of the present invention is installed inside the non-contact monitoring device 202, and the infrared sensing module 13 is activated to turn on the infrared sensing function of the non-contact monitoring system 2, so as to detect the presence of an organism 201. In step S42, the infrared sensing module 13 transmits an infrared sensing signal S3 to the micro control unit 14 of the non-contact monitoring system 2. The micro control unit 14 then determines whether the organism 201 is present in the area 20. If the micro control unit 14 determines that the organism 201 is not present in the area 20, the method of the present invention will return to step S41 to re-detect. If the micro control unit 14 determines that the organism is present in the area 20, then the method of the present invention will continue to step S43. In step S43, the radar detection module 11 is activated to turn on the radar detection function of the non-contact monitoring system 2, and the infrared sensing module 13 is activated to turn on the infrared sensing function of the non-contact monitoring system 2, so as to monitor the movements of the organism 201 in the area 20. In step S44, when one of the radar detection module 11 and the infrared sensing module 13 detects that the organism is in an emergency situation, the method of the present invention will continue into step S45. In step S45, when the emergency situation is detected by one of the radar detection module 11 and the infrared sensing module 13, the non-contact monitoring system 2 will send out an alarm signal S6 to a remote monitoring end 25 with the micro control unit 14 and the communication module 15. Meanwhile, the microphone 21 and the speaker 24 are activated for the two-way voice communication between the organism 201 and the remote monitoring end 25. Eventually, the present invention will enter step S46. In step S46, after the emergency situation has happened, the non-contact monitoring system 2 will detect the vital signs information of the organism with the radar detection module 11, such as the rise and fall of the chest cavity of the organism 201 when the organism 201 is breathing, or the heart rhythm of the heartbeat of the organism 201. At the same time, the detection result is sent back to the remote monitoring end 25 by the communication module 15, so the remote monitoring end 25 is updated with the health situation of the organism 201.

The non-contact monitoring method of the present invention monitors the target with both the radar detection module 11 and the infrared sensing module 13; therefore, when the organism 201 falls down in the area 20 (e.g., bathroom), the target will not be confused with the heat radiation generated by hot water or steam. Furthermore, since the non-contact monitoring method monitors the location and movements of the organism 201 with both radar detection module 11 and infrared sensing module 13, the disadvantages of only using the radar detection system can be avoided.

Although the operation of the method according to the embodiments of the present invention has been described in a certain order, it is not meant to limit the order of the steps. It should be apparent to those skilled in the art that the method can also be performed in a different order. Therefore, the order of the steps should not be seen as a limitation to the claims of the present invention. In addition, the method in the claims should not be limited by the order of steps described above. Those who are skilled in the art should understand that the order of the steps can be changed without departing from the scope of the present invention.

Although the present invention has been described with reference to the preferred embodiments thereof, it is apparent to those skilled in the art that a variety of modifications and changes may be made without departing from the scope of the present invention which is intended to be defined by the appended claims.

What is claimed is:
1. A non-contact monitoring system, comprising:
   a radar detection module respectively connected to a radar antenna and a micro control unit, wherein the radar detection module transmits a radar detection signal via the radar antenna to an area, receives a radar reflection signal from the area via the radar antenna, and transmits the radar reflection signal to the micro control unit; and an infrared sensing module connected to the micro control unit, wherein the infrared sensing module detects a heat source of an organism in the area and transmits an infrared sensing signal to the micro control unit;

wherein the micro control unit is respectively connected to the radar detection module, the infrared sensing module and a communication module; the micro control unit receives and processes the radar reflection signal transmitted by the radar detection module and the infrared sensing signal transmitted by the infrared sensing module, and transmits an alarm signal to the communication module;

wherein the communication module is respectively connected to the micro control unit and an antenna; the communication module receives the alarm signal transmitted by the micro control unit, and transmits the alarm signal to a remote monitoring end via the antenna;

wherein when one of the radar detection module and the infrared sensing module detects that an emergency situation has happened to the organism, the micro control unit transmits the alarm signal to the communication module and activates the radar detection module to detect vital signs information of the organism.

2. The non-contact monitoring system according to claim 1, wherein the vital signs information is wiredly or wirelessly transmitted to the remote monitoring end by the communication module.

3. The non-contact monitoring system according to claim 1, wherein the vital signs information includes a movement of a chest cavity of the organism when the organism is breathing, and includes a heart rhythm of the heartbeat of the organism.

4. The non-contact monitoring system according to claim 1, wherein the emergency situation includes falling of the organism and abnormal movements of the organism.

5. The non-contact monitoring system according to claim 1, wherein the organism is one of the following: a human body and an animal body.

6. The non-contact monitoring system according to claim 1, wherein the area is one of the following: a bathroom, a restroom and a kitchen.

7. The non-contact monitoring system according to claim 1, wherein the remote monitoring end is one of the following: a smart phone, a hospital and a care center.

8. The non-contact monitoring system according to claim 1, further comprising:

at least one microphone connected to an audio encoder/decoder for receiving a first audio signal from the organism;

a speaker connected to the audio encoder/decoder for playing a second audio signal transmitted by the remote monitoring end;

wherein the audio encoder/decoder is respectively connected to the at least one microphone, the speaker, the micro control unit and a power module; the audio encoder/decoder encodes the first audio signal and decodes the second audio signal;

wherein the power module is respectively connected to the radar detection module, the infrared sensing module, the micro control unit, the communication module and the audio encoder/decoder; the power module provides power to the non-contact monitoring system and the audio encoder/decoder;

wherein the communication module transmits the first audio signal to the remote monitoring end via the antenna, and the communication module receives the second audio signal transmitted by the remote monitoring end via the antenna.

9. The non-contact monitoring system according to claim 8, wherein the communication module wiredly or wirelessly transmits the first audio signal to the remote monitoring end.

10. The non-contact monitoring system according to claim 8, wherein the communication module wiredly or wirelessly receives the second audio signal transmitted by the remote monitoring end.

11. The non-contact monitoring system according to claim 8, wherein the power module comprises an AC/DC converter which directly connects the power module to an AC power source.

12. The non-contact monitoring system according to claim 8, wherein the power module is a rechargeable battery.

13. A non-contact monitoring method, comprising the following steps:

activating an infrared sensing module while turning on an infrared sensing function of a non-contact monitoring system to detect if an organism is present in an area;

using the infrared sensing module to transmit an infrared sensing signal to a micro control unit of the non-contact monitoring system, and using the micro control unit to determine whether the organism is present in the area; wherein if the micro control unit determines that the organism is not present in the area, then return to the previous step; wherein if the micro control unit determines that the organism is present in the area, then proceed to the next step;

activating the infrared sensing module and a radar detection module while turning on a radar detection function and the infrared sensing function of the non-contact monitoring system to monitor the movement of the organism in the area;

proceeding to next step when one of the radar detection module and the infrared sensing module detects that an emergency situation has happened to the organism;

transmitting an alarm signal to a remote monitoring end with the micro control unit and a communication module of the non-contact monitoring system while activating a microphone and a speaker to perform a two-way voice communication between the organism and the remote monitoring end; and detecting vital signs information of the organism with the radar detection module, and transmitting the vital signs information to the remote monitoring end via the communication module.

14. The non-contact monitoring method according to claim 13, wherein the vital signs information includes a movement of a chest cavity of the organism when the organism is breathing, and includes a heart rhythm of the heartbeat of the organism.

15. The non-contact monitoring method according to claim 13, wherein the emergency situation includes falling of the organism and abnormal movements of the organism.

16. The non-contact monitoring method according to claim 13, wherein the organism is one of the following: a human body, and an animal body.

17. The non-contact monitoring method according to claim 13, wherein the area is one of the following: a bathroom, a restroom, and a kitchen.

18. The non-contact monitoring method according to claim 13, wherein the remote monitoring end is one of the following: a smart phone, a hospital, and a care center.

\* \* \* \* \*